E. P. WEICHEL.
CLOTHESLINE FASTENER.
APPLICATION FILED FEB. 12, 1919. RENEWED JAN. 12, 1921.
1,369,149.
Patented Feb. 22, 1921.
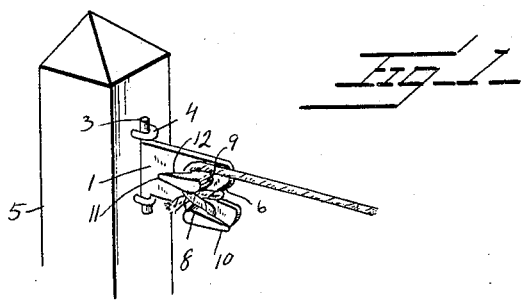
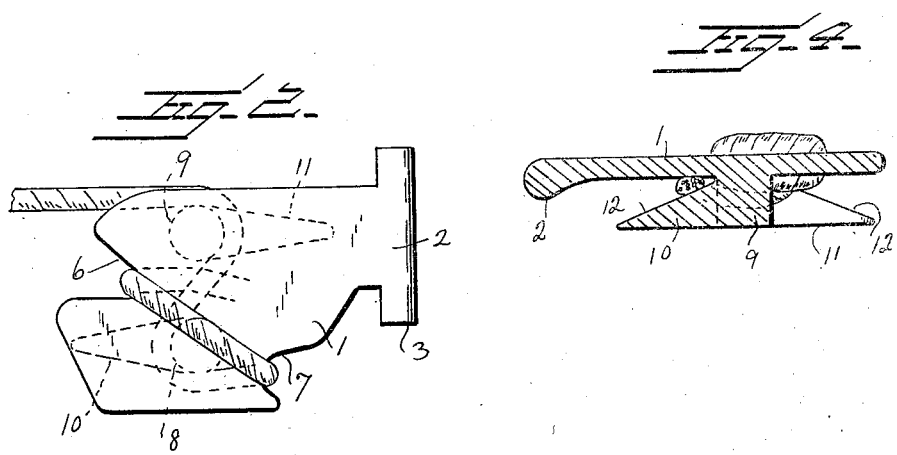
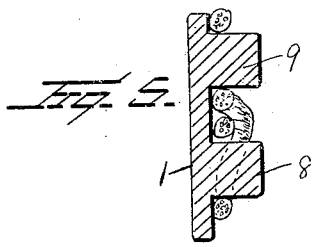
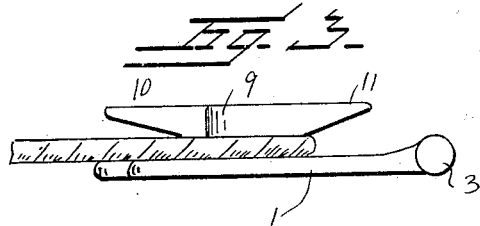
Inventor
E. P. Weichel
By Watson E. Coleman
Attorney

UNITED STATES PATENT OFFICE.

EDWARD P. WEICHEL, OF BETHLEHEM, PENNSYLVANIA.

CLOTHESLINE-FASTENER.

1,369,149.  Specification of Letters Patent.  Patented Feb. 22, 1921.

Application filed February 12, 1919, Serial No. 276,483. Renewed January 12, 1921. Serial No. 436,826.

*To all whom it may concern:*

Be it known that I, EDWARD P. WEICHEL, a citizen of the United States, residing at Bethlehem, in the county of Northampton and State of Pennsylvania, have invented certain new and useful Improvements in Clothesline-Fasteners, of which the following is a specification, reference being had to the accompanying drawings.

This invention relates to a clothes-line fastener, and the aim of the invention is to provide a fastener, for anchoring a clothes-line or rope to a post.

The invention further aims to afford means, whereby the anchoring of the clothes-line to the post may be facilitated, and the line may be secured, but also facilitate the attaching of the clothes-line.

The invention further aims to provide a plate carried by the post and provided with diagonal line engaging notches, which may be engaged by the line, and means on one face of the plate, provided with beveled projections extending in opposite directions and offset from each other, with which the line may engage, a portion of the line between said means overlying the end portion of the line and clamping thereagainst, owing to the beveled surfaces of the projections, thereby securely anchoring the line to the plate.

The design and construction of the fastener at the present time is deemed preferable. However, in reducing the device to a practical form for commercial purposes alterations may be found necessary in the details of construction. The right to these alterations is claimed, provided they are warranted within the scope of what is claimed.

The invention comprises further features and combination of parts, as hereinafter set forth, shown in the drawings and claimed.

In the drawings:

Figure 1 is a perspective view of the improved fastener constructed in accordance with the invention.

Fig. 2 is a view of the opposite face of the factener.

Fig. 3 is a plan view.

Fig. 4 is a sectional view on line 4—4 of Fig. 1.

Fig. 5 is a sectional view vertically on line 5—5 of Fig. 1.

Referring more especially to the drawings 1 designates a plate, one end of which is provided with a cylindrical part 2, having extensions 3, which are straddled by steeples 4, which pierce a post 5, thereby pivotally anchoring the plate to the post.

The plate is provided with diagonally opposite V-shaped notches 6 and 7. Upon one face of the plate projections 8 and 9 are formed. These projections are spaced, one being super-imposed. These projections have lateral lugs or extensions 10 and 11, the faces 12 of which adjacent the face of the plate are inclined toward the projections and the plate, so that the space between the lugs and the plate are substantially V-shaped. It is obvious that the lugs 10 and 11 extend in opposite directions as shown.

It is obvious that when fastening the clothes-line in place, the end portion of the line is placed in contact with one face of the plate at a point between the projections 8 and 9, then in engagement with the notch 6, in contact with the opposite face of the plate, and in engagement with the notch 7. The line is then wedged between the inclined face of the lug 11 and the plate, and then diagonally disposed in a position overlying the end portion of the line, and then wedged between the inclined face 12 of the lug 9 and face of the plate, whereby the line may be extended to an opposite fastener of another post, and connected thereto in a similar manner. It is obvious that by the line being disposed in a diagonal position across the end portion of the line, which is in contact with one face of the plate, and since the end portion of the line has a knotted enlargement, the end portion of the line is held against slipping, in fact securely clamped.

The invention having been set forth, what is claimed as new and useful is:

1. A line fastener, comprising a plate having at one end means, whereby the plate may be fulcrumed to a stationary support, the other end of the plate, having one edge portion enlarged, the edge of this latter end having a V-shaped notch, the enlarged edge portion of the plate having its edge diagonally opposite the notched end edge, being provided with a second notch, one face of the plate having spaced lateral lugs, said lugs being positioned on a line in a plane between the two notches, whereby the line may pass about one lug and extend diagonally toward and engaging about the other lug, and then in engagement with the latter notch, then extended adjacent the other face of the plate and in engagement with the former notch, the extremity of the line being clamped between the diagonal portion of the line and one face of the plate, said lugs having projections extending in opposite directions, said projections having their faces inclining from the lugs at points where the lugs merge integrally with the face of the plate, thereby acting to clamp the line toward the face of the plate, constantly urging the diagonal portion of the line against the extremity of the line to clamp the same securely.

2. In combination, a plate the opposite edges thereof being provided with V-shaped notches, a line to engage said notches, one face of the plate having lateral projections superimposed and spaced, said projections having lateral lugs extending in opposite directions, the projections being engaged by opposite super-imposed loops of the line, an intermediate diagonal portion of the line diagonally overlying the end part of the line which engages one of the notches, to clamp the line secure, the faces of the lugs adjacent the plate being inclined toward the plate, thereby affording V-shaped spaces between the lugs and the plate into which the superimposed spaced loops of the line may be wedged, so as to dispose the intermediate diagonal part of the line arch-shaped over the end portion of the line to render the line more securely clamped to the end of the plate.

In testimony whereof I hereunto affix my signature in the presence of two witnesses.

EDWARD P. WEICHEL.

Witnesses:
RICHARD FLEMMING,
WILLIAM SCHAEFFER.